United States Patent
Zhang et al.

(10) Patent No.: US 9,531,486 B2
(45) Date of Patent: Dec. 27, 2016

(54) QUALITY MEASUREMENT METHOD, USER EQUIPMENT, AND NETWORK-SIDE DEVICE

(71) Applicant: Huawei Technologies Co., Ltd., Shenzhen (CN)

(72) Inventors: Peng Zhang, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/701,884

(22) Filed: May 1, 2015

(65) Prior Publication Data

US 2015/0236803 A1    Aug. 20, 2015

Related U.S. Application Data

(63) Continuation of application No. PCT/CN2013/083231, filed on Sep. 10, 2013.

(30) Foreign Application Priority Data

Nov. 2, 2012  (WO) ................ PCT/CN2012/084007

(51) Int. Cl.
*H04B 17/309* (2015.01)
*H04W 24/08* (2009.01)
*H04W 24/10* (2009.01)

(52) U.S. Cl.
CPC ........... *H04B 17/309* (2015.01); *H04W 24/08* (2013.01); *H04W 24/10* (2013.01)

(58) Field of Classification Search
None
See application file for complete search history.

(56) References Cited

U.S. PATENT DOCUMENTS

2012/0113843 A1*  5/2012  Watfa ................ H04W 72/1289
                                                              370/252
2012/0176925 A1   7/2012  Hwang
(Continued)

FOREIGN PATENT DOCUMENTS

CN       101986586 A       3/2011
CN       102368697 A       3/2012
(Continued)

*Primary Examiner* — Edan Orgad
*Assistant Examiner* — Saumit Shah
(74) *Attorney, Agent, or Firm* — Leydig, Voit & Mayer, Ltd.

(57) ABSTRACT

The present invention is applicable to the field of wireless communications technologies, and provides a quality measurement method, a user equipment, and network-side device. The method includes: receiving, by a user equipment (UE), resource restricted subframe (RRS) information sent by a network-side device; and performing, by the UE, downlink channel quality measurement and/or downlink physical layer channel quality measurement according to the RRS information. In the present invention, the UE performs the downlink channel quality measurement or downlink physical layer channel quality measurement according to the RRS information sent by the network-side device. By using this measurement method, the UE can obtain a more accurate downlink channel quality measurement result or downlink physical layer channel quality measurement result.

2 Claims, 3 Drawing Sheets

```
A user equipment UE receives resource restricted         101
subframe RRS information sent by a network-side device

↓

The UE performs downlink channel quality measurement     102
   and/or downlink physical layer channel quality
   measurement according to the RRS information
```

(56) References Cited

U.S. PATENT DOCUMENTS

| | | |
|---|---|---|
| 2012/0263054 A1 | 10/2012 | Kazmi et al. |
| 2013/0028123 A1* | 1/2013 | Marinier ............... H04B 1/707 370/252 |
| 2013/0279343 A1* | 10/2013 | Jeong .................... H04W 24/10 370/241 |
| 2014/0064133 A1* | 3/2014 | Kazmi .................. H04W 24/10 370/252 |
| 2014/0355468 A1 | 12/2014 | Li et al. |

FOREIGN PATENT DOCUMENTS

| | | |
|---|---|---|
| CN | 102368759 A | 3/2012 |
| CN | 102752863 A | 10/2012 |
| WO | WO 2009124466 A1 | 10/2009 |
| WO | WO 2012064265 A1 | 5/2012 |

* cited by examiner

QUALITY MEASUREMENT METHOD, USER EQUIPMENT, AND NETWORK-SIDE DEVICE

CROSS-REFERENCE TO RELATED APPLICATION

This application is a continuation of International Patent Application No. PCT/CN2013/083231 filed Sep. 10, 2013, which claims priority to International Patent Application No. PCT/CN2012/084007, filed Nov. 2, 2012, both of which are hereby incorporated by reference in their entireties.

TECHNICAL FIELD

The present invention relates to the field of wireless communications technologies, and in particular, to a quality measurement method, a user equipment, and a network-side device.

BACKGROUND

With development of communications technologies, new technologies increasingly emerge. Wideband Code Division Multiple Access (Wideband Code Division Multiple Access, WCDMA) is a third-generation wireless communications system that is most widely used at present. How to evolve a WCDMA system to adapt to a user requirement of high speed uplink and downlink data transmission is a most important research subject in the field of wireless communications. Starting from R5, a series of important technologies are introduced into WCDMA to improve uplink and downlink data transmission rates, such as High Speed Downlink Packet Access (High Speed Downlink Packet Access, HSDPA), High Speed Uplink Packet Access (high speed uplink packet access, HSUPA), multiple-input multiple-output (Multiple-Input Multiple-Output, MIMO), and 64 quadrature amplitude modulation (Quadrature Amplitude Modulation, QAM). After a research on several versions, the research on the improvement of transmission efficiency of a wireless channel hits a bottleneck. To meet the user requirement and address challenges from other technologies, a heterogeneous networking manner—a heterogeneous network (Heterogeneous Network, Hetnet) is taken into consideration for the WCDMA system, that is, networking is performed by using a macrocell (a first cell) with a large coverage area and a microcell (a second cell) with a small coverage area. A coverage area of a cell depends on downlink transmit power of the cell. The Hetnet brings the following benefits: a throughput of the cell is increased, and a cost of the Hetnet is lower than that of a homogeneous network (Homogeneous Network, Homonet) networked by using all first cells.

In the Hetnet, to reduce load of the first cell, a user equipment (User Equipment, UE) at the edge of the first cell is allocated to the second cell for scheduling, and such a practice is referred to as range expansion (Range Expansion, RE). Before RE is performed, the UE sets the second cell as a serving cell only when a geometry factor (Geometry factor) of the second cell is greater than a value (generally 0 dB), and then the UE can be scheduled by the second cell. After RE is performed, the value is generally set to be relatively small (for example, −6 dB), that is, when the Geometry factor of the second cell measured by the UE is −6 dB, the second cell is set as a serving cell, and then the UE is scheduled by the second cell.

However, after RE is performed, an original first-cell UE is changed into a second-cell UE, but a second-cell Geometry factor in an RE region in which the second-cell UE is located is quite low (for example, −6 dB to 0 dB). Therefore, downlink channel quality of the second-cell UE is extremely poor. This is because the RE region in which the second cell UE is located is originally at the edge of the first cell, and a signal from the first cell is strong interference signal for the second-cell UE in the RE region. Therefore, the second cell can only schedule small downlink data packets for these UEs.

In the prior art, the basis of cell pilot measurement is as follows: when Ec/Io of a pilot of a cell is greater than −20 dB, it is considered that the cell is detected by a UE. Ec is energy per chip, and Io is a total power spectrum density at a receiver, including external interference (interference from a neighboring cell and thermal noise) and a signal of the receiver. When Ec/Io is small, Ec/Io may be approximately equal to Ec/Ioc because the signal of the receiver is weak, where Ioc is a total interference power spectrum density at the receiver.

A range of the RE region is restricted by Ec/Io, of a pilot of the second cell, detected by the UE; according to a protocol, when Ec/Ioc, of the pilot of the second cell, detected by the UE is about −20 dB, it is considered that the UE detects the second cell. Therefore, when Ec/Ior of the pilot of the second cell is −10 dB, a geometry factor Ior/Ioc corresponding to Ec/Ioc is generally calculated as follows: Ior/Ioc=Ec/Ioc*Ior/Ec=−10 dB, where Ec is energy per chip, Ior is a total transmit power spectrum density at a transmitter, Ioc is a total interference power spectrum density at a receiver, and Ior/Ioc is the geometry factor. In other words, RE can reach at most a place in which a geometry factor of the second cell is −10 dB. This measurement method greatly limits the expansion range, and achieves a quality measurement result with low precision for the second-cell UE in the RE region.

SUMMARY

Embodiments of the present invention provide a quality measurement method, a user equipment, and a network-side device, which aim to solve a problem of low precision in a downlink channel quality measurement result or a downlink pilot quality measurement result or a downlink link quality measurement result of a UE in the prior art.

According to a first aspect, a quality measurement method is provided, where the method includes:

receiving, by a user equipment (UE), resource restricted subframe (RRS) information sent by a network-side device; and performing, by the UE, downlink channel quality measurement and/or downlink pilot quality measurement and/or downlink link quality measurement according to the RRS information.

With reference to the first aspect, in a first possible implementation manner, the RRS information includes RRS enabling or disabling information and/or an RRS pattern mode and/or an RRS pattern.

With reference to the first aspect and according to the first possible implementation manner, in a second possible implementation manner, the RRS information is carried in a downlink high speed shared control channel order or the RRS information is included in higher layer signaling.

With reference to the first aspect and according to the second possible implementation manner, in a third possible implementation manner, the UE performs the downlink pilot quality measurement in an RRS subframe according to the RRS information when the UE performs the downlink pilot quality measurement according to the RRS information; or the UE performs the downlink link quality measurement in an RRS subframe according to the RRS information when the UE performs the downlink link quality measurement according to the RRS information; or the UE performs the downlink channel quality measurement in an RRS subframe according to the RRS information when the UE performs the downlink channel quality measurement according to the RRS information.

According to the third possible implementation manner, in a fourth possible implementation manner, the performing, by the UE, the downlink pilot quality measurement in an RRS subframe according to the RRS information when the UE performs the downlink pilot quality measurement according to the RRS information includes:

performing pilot quality measurement in the RRS subframe when a serving cell of the UE is a first cell, and the RRS information meets the following conditions: the RRS enabling or disabling information indicates that an RRS is enabled and the RRS pattern mode information indicates that a measurement mode is a pilot quality measurement mode.

According to the third possible implementation manner, in a fifth possible implementation manner, the performing, by the UE, the downlink link quality measurement in an RRS subframe according to the RRS information when the UE performs the downlink link quality measurement according to the RRS information includes:

performing link quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a link quality measurement mode.

According to the third possible implementation manner, in a sixth possible implementation manner, the performing, by the UE, the downlink channel quality measurement in an RRS subframe according to the RRS information when performing the downlink channel quality measurement includes:

performing the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode.

According to the fifth possible implementation manner, in a seventh possible implementation manner, the performing, by the UE, the downlink channel quality measurement in an RRS subframe according to the RRS information further includes:

aligning a channel quality measurement reference time window with a high speed physical downlink shared channel (HS-PDSCH) subframe when the UE does not receive the RRS pattern information.

According to the fifth possible implementation manner, in an eighth possible implementation manner, the performing the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode includes:

performing, when the UE receives the RRS pattern information, the downlink channel quality measurement based on an RRS subframe that is closest to a channel quality indicator (CQI) before the CQI is transmitted.

According to the eighth possible implementation manner, in a ninth possible implementation manner, the performing, when the UE receives the RRS pattern information, the downlink channel quality measurement based on an RRS subframe that is closest to a CQI before the CQI is transmitted includes:

when the UE reports a CQI, reporting, according to the RRS pattern information, only a CQI corresponding to a first RRS subframe of 2 RRS subframes, and skipping reporting another CQI corresponding to a non-RRS subframe.

According to the eighth possible implementation manner, in a tenth possible implementation manner, the performing, when the UE receives the RRS pattern information, the downlink channel quality measurement based on an RRS subframe that is closest to a CQI before the CQI is transmitted includes:

when the UE reports a CQI, repeatedly reporting, according to the RRS pattern information, a CQI corresponding to a first RRS subframe of 2 RRS subframes.

According to the tenth possible implementation manner, in an eleventh possible implementation manner, transmit power when the UE repeatedly reports the CQI is lower than that when the UE normally reports the CQI.

According to a second aspect, a user equipment is provided, where the user equipment includes:

an RRS information receiving unit, configured to receive resource restricted subframe RRS information sent by a network-side device; and a quality measurement unit, configured to perform downlink channel quality measurement and/or downlink pilot quality measurement and/or downlink link quality measurement according to the RRS information.

With reference to the second aspect, in a first possible implementation manner, the RRS information includes RRS enabling or disabling information and/or RRS pattern mode information and/or RRS pattern information.

With reference to the second aspect, in a second possible implementation manner, the RRS information is carried in a downlink high speed shared control channel order or the RRS information is included in higher layer signaling, and is sent to the UE by the network-side device.

With reference to the second aspect, in a third possible implementation manner, the quality measurement unit performs the downlink pilot quality measurement in an RRS subframe according to the RRS information when performing the downlink pilot quality measurement; or the quality measurement unit performs the downlink link quality measurement in an RRS subframe according to the RRS information when performing the downlink link quality measurement; or the quality measurement unit performs the downlink channel quality measurement in an RRS subframe according to the RRS information when performing the downlink channel quality measurement.

According to the third possible implementation manner, in a fourth possible implementation manner, the quality measurement unit includes:

a pilot quality measurement module, where the pilot quality measurement module is, when performing the downlink pilot quality measurement, configured to perform pilot quality measurement in the RRS subframe when a serving cell of the UE is a first cell, and the RRS information meets the following conditions: the RRS enabling or disabling information indicates that an RRS is enabled and the RRS pattern mode information indicates that a measurement mode is a pilot quality measurement mode.

According to the fourth possible implementation manner, in a fifth possible implementation manner, the quality measurement unit includes:

a link quality measurement module, where the link quality measurement module is, when performing the downlink link quality measurement, configured to perform link quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a link quality measurement mode.

According to the fourth possible implementation manner, in a sixth possible implementation manner, the quality measurement unit includes:

a channel quality measurement module, wherein the channel quality measurement module is, when performing the downlink channel quality measurement, configured to perform the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode.

According to the sixth possible implementation manner, in a seventh possible implementation manner, the channel quality measurement module includes:

a first measurement submodule, configured to align a channel quality measurement reference time window with a downlink HS-PDSCH subframe when the UE does not receive the RRS pattern information.

According to the sixth possible implementation manner, in an eighth possible implementation manner, the channel quality measurement module includes:

a second measurement submodule, configured to: when the UE receives the RRS pattern information, perform the downlink channel quality measurement based on an RRS subframe that is closest to a CQI before the CQI is transmitted.

According to the eighth possible implementation manner, in a ninth possible implementation manner, the second measurement submodule includes:

a first reporting micro-unit, configured to: when reporting a CQI, repeatedly report, according to the RRS pattern information, a CQI corresponding to a first RRS subframe of 2 RRS subframes.

According to the eighth possible implementation manner, in a tenth possible implementation manner, the second measurement submodule includes:

a second reporting micro-unit, configured to: when reporting a CQI, report, according to the RRS pattern information, only a CQI corresponding to a first RRS subframe of 2 RRS subframes, and skip reporting another CQI corresponding to a non-RRS subframe.

According to the tenth possible implementation manner, in an eleventh possible implementation manner, transmit power when the second reporting micro-unit repeatedly reports the CQI is lower than that when the second reporting micro-unit normally reports the CQI.

According to a third aspect, a quality measurement method is provided, where the method includes:

acquiring resource restricted subframe (RRS) information; and sending the RRS information to a user equipment UE, so that the UE performs downlink channel quality measurement and/or downlink pilot quality measurement and/or downlink link quality measurement according to the RRS information.

With reference to the third aspect, in a first possible implementation manner, the RRS information includes RRS enabling or disabling information and/or RRS pattern mode information and/or RRS pattern information.

With reference to the third aspect, in a second possible implementation manner, the RRS information is carried in a downlink high speed shared control channel (HS-SCCH) order or the RRS information is included in higher layer signaling.

According to a fourth aspect, a network-side device is provided, including: an acquiring unit, configured to acquire resource restricted subframe RRS information; and a sending unit, configured to send the RRS information to a user equipment (UE), so that the UE performs downlink channel quality measurement and/or downlink pilot quality measurement and/or downlink link quality measurement according to the RRS information.

With reference to the fourth aspect, in a first possible implementation manner, the acquiring unit acquires the RRS information according to UE information in a first cell and a second cell.

With reference to the fourth aspect, in a second possible implementation manner, the acquiring unit acquires the RRS information according to the number of UEs in a first cell and the number of UEs in a second cell, and a throughput of a UE at an edge of the first cell and a throughput of a UE at an edge of the second cell.

According to the second possible implementation manner, in a third possible implementation manner, the acquiring unit determines RRS pattern information according to a proportion of the total number of UEs in the first cell to the total number of UEs in the second cell.

In the embodiments of the present invention, a UE performs downlink channel quality measurement and/or downlink physical layer channel quality measurement according to RRS information sent by a network-side device. By using this measurement method, the UE can obtain a more accurate downlink channel quality measurement result or downlink physical layer channel quality measurement result.

DESCRIPTION OF EMBODIMENTS

Figure 1:
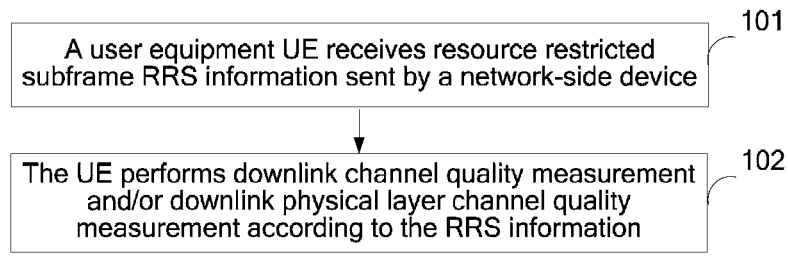
FIG. 1 shows a quality measurement method according to an embodiment of the present invention.

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

When a resource restricted subframe (Resource Restricted Subframe, RRS) technology is used, and when a resource is power of a high speed physical downlink shared channel (High speed-physical downlink shared channel, HS-PDSCH), the RRS is equivalent to an almost blank subframe (Almost blank subframe, ABS). That is, a second cell and a first cell collaboratively schedule their respective UEs according to a standard. In an ABS subframe, the first cell reduces transmit power of an HS-PDSCH subframe aligned with the first cell, and the second cell schedules a second-cell UE according to normal transmit power. In this way, interference of the first cell to a second-cell UE in an RE region may be reduced, so that the second cell and the second-cell UE achieve better downlink channel quality in the ABS subframe. In a non-ABS subframe, the first cell schedules a first-cell UE according to a normal transmit resource (for example, full transmit power); the second cell schedules all second-cell UEs (including second-cell UEs in an RE region) according to a normal transmit resource, or schedules second-cell UEs except those in the RE region according to a normal transmit resource. Optionally, in a non-ABS subframe, the second cell sends a signal to a UE by using fewer resources, and the first cell sends a signal to a UE by using more resources; in an ABS subframe, the second cell transmits a signal to the UE at higher power, and the first cell transmits a signal to the UE at lower power. In this way, the second cell and the first cell reduce neighboring cell interference for each other.

Channel quality indicator (Channel quality indicator, CQI) measurement is based on a 3-timeslot reference subframe, where the subframe ends at a timeslot before a CQI is sent. Meanwhile, the CQI is carried on an uplink dedicated physical control channel (High speed-dedicated physical control channel, HS-DPCCH), and the HS-DPCCH includes two parts, where a first part is an ACK/NACK, which occupies one timeslot, and a second part is a CQI, which occupies two timeslots. The sending of the ACK/NACK and the sending of the CQI are independent, that is, whether to send the ACK/NACK is unrelated to whether to send the CQI.

It is stipulated in a protocol that, an ACK/NACK must be sent at about the $7.5^{th}$ timeslot after the UE receives a high speed physical downlink shared channel (High speed-physical downlink shared channel, HS-PDSCH) subframe. This stipulation also determines sending time of an HS-DPCCH, or sending time of a CQI.

In an almost blank subframe (Almost blank subframe, ABS), a first cell reduces transmit power, so that data scheduled by a second cell has better receiving performance. Therefore, a position of the ABS subframe needs to be set according to a position of an HS-PDSCH, that is, a position at which the second cell schedules the HS-PDSCH is a position of the ABS subframe. By using a frame with a length of 15 timeslots as an example, if the UE completes receiving the HS-PDSCH at the end of the $5^{th}$ timeslot, the HS-DPCCH must be transmitted at the $12.5^{th}$ timeslot. Correspondingly, there are 5 possible transmit positions of the HS-PDSCH, which determines 5 possible transmit positions of the HS-DPCCH. Therefore, 5 possible transmit positions of a CQI may also be determined, that is, the $1.5^{th}$, $4.5^{th}$, $7.5^{th}$, $10.5^{th}$, and $13.5^{th}$ timeslots.

It is assumed that the ABS subframe is located at the $9^{th}$, $10^{th}$ or $11^{th}$ timeslots, and shares a same position as an HS-PDSCH subframe. According to an existing protocol, if the CQI starts from the $12.5^{th}$ timeslot, a measurement reference subframe corresponding to the CQI starts from the $10.5^{th}$ timeslot. As a result, the following problem arises: the measurement reference subframe of the CQI does not coincide with the ABS subframe, and includes 1.5 timeslots during which interference from the first cell is small, and 1.5 timeslots during which interference from the first cell is large. As a result, the CQI is relatively small, and a data block scheduled by the second cell for the UE is relatively small.

Implementation of the present invention is described below in detail with reference to specific embodiments:

A first embodiment of the present invention provides a quality measurement method, and referring to FIG. 1, the method includes:

101: A user equipment UE receives resource restricted subframe RRS information sent by a network-side device.

In this embodiment of the present invention, the RRS information includes RRS enabling or disabling information and/or RRS pattern mode information and/or RRS pattern information.

The RRS information is carried in a high speed physical downlink shared control channel order, and is sent to the UE by the network-side device.

102: The UE performs downlink channel quality measurement and/or downlink physical layer channel quality measurement according to the RRS information.

In this embodiment of the present invention, the UE performs the downlink channel quality measurement and/or downlink physical layer channel quality measurement in an RRS subframe according to the RRS information.

Further, the downlink physical layer channel quality measurement includes pilot quality measurement and link quality measurement, and the performing the downlink physical layer channel quality measurement in an RRS subframe according to the RRS information may include:

performing the pilot quality measurement in the RRS subframe when a serving cell of the UE is a first cell, and the RRS information meets the following conditions: the RRS enabling or disabling information indicates that an RRS is enabled and the RRS pattern mode information indicates that a measurement mode is a pilot quality measurement mode.

Further, the performing the downlink channel quality measurement in an RRS subframe according to the RRS information includes:

performing the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode.

Further, the performing the downlink physical layer channel quality measurement in an RRS subframe according to the RRS information includes:

performing the link quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a link quality measurement mode.

Further, the performing the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode includes:

aligning a channel quality measurement reference time window with a downlink HS-PDSCH subframe when the UE does not receive the RRS pattern information.

Further, the performing the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode includes:

performing, when the UE receives the RRS pattern information, the downlink channel quality measurement based on an RRS subframe that is closest to a channel quality indicator CQI before the CQI is transmitted.

Further, the performing, when the UE receives the RRS pattern information, the downlink channel quality measurement based on an RRS subframe that is closest to a channel quality indicator CQI before the CQI is transmitted includes:

when the UE reports a CQI, repeatedly reporting, according to the RRS pattern information, a CQI corresponding to a first RRS subframe of 2 RRS subframes.

Further, the performing, when the UE receives the RRS pattern information, the downlink channel quality measurement based on an RRS subframe that is closest to a channel quality indicator CQI before the CQI is transmitted includes:

when the UE reports a CQI, reporting, according to the RRS pattern information, only a CQI corresponding to a first RRS subframe of two RRS subframes, and skipping reporting another CQI corresponding to a non-RRS subframe.

Further, the repeatedly reporting, according to the RRS pattern, a CQI corresponding to a first RRS subframe of two RRS subframes when the UE reports a CQI is specifically that:

transmit power when the UE repeatedly reports the CQI is lower than that when the UE normally reports the CQI.

Figure 2:
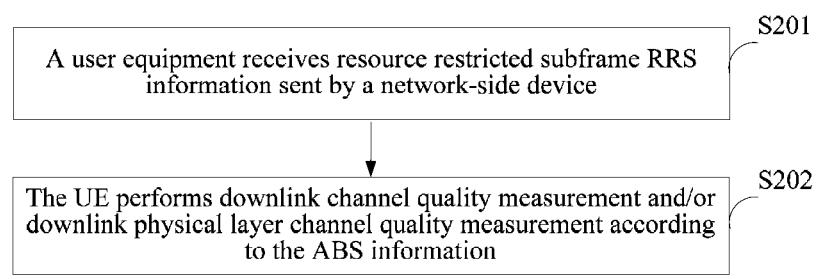
FIG. 2 shows another quality measurement method according to an embodiment of the present invention.

A second embodiment of the present invention provides a quality measurement method, and referring to FIG. 2, the method includes:

In step S201, a user equipment receives ABS information sent by a network-side device.

Figure 3:
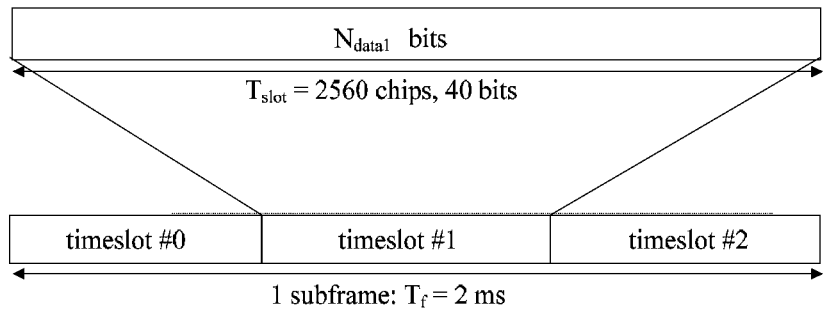
FIG. 3 shows an HS-SCCH channel format according to an embodiment of the present invention.

This embodiment is applicable to a heterogeneous network. This embodiment is executed by a device of a network-side device (hereinafter referred to as a network-side device). The network-side device may be, but is not limited to, a radio network controller (Radio Network Controller, RNC for short), and may also be, for example, a base station in a cell. The RRS information may be higher layer RRC signaling from an RNC, and may also be physical layer signaling, namely, an HS-SCCH order, from a base station. A format of an HS-SCCH channel is shown in FIG. 3.

In this embodiment of the present invention, the RRS information is determined by the network-side device. An RRS resource may be power that can be used, and may also be a modulation mode that can be used, a channelization code that can be used, and the like. When the resource is the modulation mode, the RRS information may be modulation mode information. When the resource is power, the RRS information may be ABS information, which belongs to the prior art and is not described herein again. The following description uses an example in which the RRS information is ABS information.

The ABS information may include: ABS enabling or disabling information and/or ABS pattern mode information and/or ABS pattern information.

Optionally, the ABS enabling or disabling information is a binary symbol, used to indicate whether a UE and/or a network enters an ABS state. For example, 1 indicates that an ABS is enabled, and 0 indicates that an ABS is disabled. When the ABS enabling or disabling information that is included in the RRS information sent by the network-side device and received by the UE indicates that the ABS is enabled, the UE enters the ABS state. Downlink channel quality measurement or downlink physical layer channel quality measurement is performed by using a measurement mode different from that before the UE enters the ABS state. This measurement mode includes but is not limited to a pilot quality measurement mode, a CQI measurement mode, and a link quality measurement mode.

Optionally, the ABS pattern mode information is a binary symbol, used to indicate different meanings of the ABS pattern information. For example:

when ABS pattern mode information=0, it indicates that pilot quality measurement of the UE needs to be performed in combination with the ABS pattern information;

when ABS pattern mode information=1, it indicates that channel quality measurement (including but not limited to CQI measurement) of the UE needs to be performed in combination with the ABS pattern information; and when ABS pattern mode=2, it indicates that link quality measurement of the UE needs to be performed in combination with an ABS pattern, where the link quality measurement includes but is not limited to fractional dedicated physical channel (Fractional-Dedicated Physical Channel, F-DPCH)/dedicated physical channel (Dedicated Physical Channel, DPCH) measurement.

The ABS pattern information is a string of symbol sequences with a length of N, where N>1, and each symbol represents a state corresponding to a subframe. If a subframe has two states, that is, an ABS subframe (a first cell is in a low transmit power state) and a non-ABS subframe (a first cell is in a high transmit power state), then, a binary bit may be used to distinguish the ABS subframe from the non-ABS subframe. For example, 1 represents the ABS subframe, and 0 represents the non-ABS subframe. An ABS pattern is periodic. For example, if a period is 8, a period of ABS pattern information is 8. An example of the ABS pattern information with a period of 8 is 00000001 . . . , where the first 7 subframes are non-ABS subframes, and the $8^{th}$ subframe is an ABS subframe.

In an optional embodiment, when the UE receives only the ABS enabling or disabling information, the UE starts a new CQI measurement mode. In another optional embodiment, when the UE receives only the ABS pattern information, and the UE and the network-side device predetermine an ABS mode, the UE starts measurement corresponding to this ABS mode. In still another optional embodiment, when the UE receives only the ABS pattern mode information, and this mode is corresponding to CQI measurement, the UE starts new CQI measurement. In yet another optional embodiment, when the UE receives both the ABS pattern mode information and the ABS pattern information, the UE starts, according to the ABS pattern information, measurement corresponding to an ABS pattern mode.

Optionally, the network-side device may send some or all of the ABS information to the UE by using higher layer signaling, and may also send some or all of the ABS information to the UE by using a high speed physical downlink shared control channel (High Speed Physical Downlink Shared Control Channel, HS-SCCH) order, that is, an HS-SCCH order, that carries signaling information. Optionally, some or all of the ABS information may be sent to the UE by using both methods simultaneously or by selecting only one of the methods.

When some or all of the ABS information is sent to the UE by using higher layer signaling, a new information element (Information Element, IE) needs to be added to the higher layer signaling to represent the ABS information. A corresponding IE needs to be set for each piece of ABS information, which belongs to the prior art and is not described herein again. It should be noted that, some of the ABS information herein refers to sending only one or two of ABS enabling or disabling information, an ABS pattern mode, and an ABS pattern to the UE.

Optionally, when some or all of the ABS information is sent to the UE by using the HS-SCCH order, the order may carry corresponding ABS information, that is, the ABS information is carried in the HS-SCCH order and sent to the UE.

An HS-SCCH channel includes three timeslots. As shown in FIG. 3, a period of a subframe is 2 ms; each timeslot includes 2560 chips, 40 bits in total.

In an existing protocol, the HS-SCCH order may be delivered to a specified UE, or all UEs belonging to a current cell. The present invention is applicable to the foregoing two scenarios. The HS-SCCH includes a bit sequence indicated by the order, and formation of the bit sequence is as follows:

Extended order type (2 bits) $X_{eodt,1}$, $X_{eodt,2}$
Order type (3 bits): $X_{odt,1}$, $X_{odt,2}$, $X_{odt,3}$
Order (3 bits): $X_{ord,1}$, $X_{ord,2}$, $X_{ord,3}$ These bit sequences may be uniquely mapped to specified meanings. The ABS enabling or disabling information and/or the ABS pattern mode information and/or the ABS pattern information in the ABS information may be mapped to these bit sequences.

Optionally, when three types of ABS pattern mode information are defined, and the HS-SCCH order needs to carry the three types of ABS information: the ABS enabling or disabling information, the ABS pattern mode information, and the ABS pattern information, a feasible mapping solution is as follows:

$x_{eodt,1}=1$, $x_{eodt,2}=1$, $x_{odt,1}=0$, $x_{odt,2}=1$ and $x_{odt,3}=0$ may be used to indicate that an ABS is enabled, and $x_{eodt,1}$, $x_{eodt,2}$, $x_{odt,1}=1$, $x_{odt,2}=0$, and $x_{odt,3}=0$ may be used to indicate that an ABS is disabled.

When there are three types of ABS pattern mode information, enabling or disabling information of a quality measurement mode may be indicated by using a combination of $x_{ord,1}$, $X_{ord,2}$, and $x_{ord,3}$ in the foregoing configuration. $X_{ord,n}=1$ indicates that measurement corresponding to the $n^{th}$ pattern mode is enabled, and $x_{ord,n}=0$ indicates that measurement corresponding to the $n^{th}$ pattern mode is disabled. Using three ABS pattern modes as an example, $X_{ord,1}$, $x_{ord,2}$, and $X_{ord,3}$ respectively indicate enabling or disabling of ABS pattern modes 0, 1 and 2. 1 indicates enabling, and 0 indicates disabling, or 0 indicates enabling, and 1 indicates disabling.

When there are two ABS pattern modes, similarly, enabling or disabling of measurement modes may be indicated by using a combination of $x_{ord,1}$ and $X_{ord,2}$.

In step S202, the UE performs downlink channel quality measurement and/or downlink physical layer channel quality measurement according to the ABS information.

In a third embodiment of the present invention, after receiving ABS information sent by a network-side device, a UE may perform corresponding quality measurement according to the information, for example, perform pilot quality measurement, downlink channel quality measurement, or link quality measurement. Specific processes of the three types of channel quality measurement are introduced below by using ABS information as RRS information:

1. Pilot Quality Measurement

The UE may perform pilot quality measurement when a serving cell of the UE is a first cell, the ABS information received by the UE includes ABS pattern information, and ABS enabling or disabling information and ABS pattern mode information meet the following conditions: the ABS enabling or disabling information indicates that an ABS is enabled, and the ABS pattern mode indicates that a measurement mode is a pilot quality measurement mode. In this case, both a neighboring cell (a second cell) and a local cell (a first cell) are in an ABS-enabled state, that is, transmit power of the first cell in a non-ABS subframe is higher than that in an ABS subframe, and a second-cell signal detected in the ABS subframe by the UE is stronger than a second-cell signal detected in the non-ABS subframe by the UE. Therefore, the UE detects, according to the ABS pattern information, whether a second-cell signal exists in the ABS subframe, which helps the UE discover the second cell earlier, and enables the second cell to have a wider expansion range. Optionally, detecting whether a second-cell signal exists in an ABS subframe may be detecting whether a second-cell signal exists only in an ABS subframe, or may be detecting whether a second-cell signal exists in both an ABS subframe and a non-ABS subframe. However, a weight of a result of the detecting in an ABS subframe is greater than that of a result of the detecting in a non-ABS subframe.

The following description uses the detecting of a second-cell signal only in an ABS subframe as an example.

The UE obtains an ABS pattern 00000001 . . . with a period of 8, and the UE learns that an ABS is enabled and an ABS pattern mode is 0. Measurement performed by the UE on a pilot of the neighboring cell (the second cell) is only based on an ABS subframe (that is, a pattern of the second cell is marked by 1), that is, pilot quality measurement is performed only in the ABS subframe. When a measurement result obtained by performing pilot measurement on the subframe is greater than a threshold, it is considered that the UE detects the pilot of the neighboring cell (the second cell).

2. Downlink Channel Quality Measurement

The UE may perform downlink channel quality measurement when a serving cell of the UE is a second cell, and the ABS information received by the UE meets the following conditions: ABS enabling or disabling information indicates that an ABS is enabled, and an ABS pattern mode indicates that a measurement mode is a downlink channel quality measurement mode.

Figure 4:
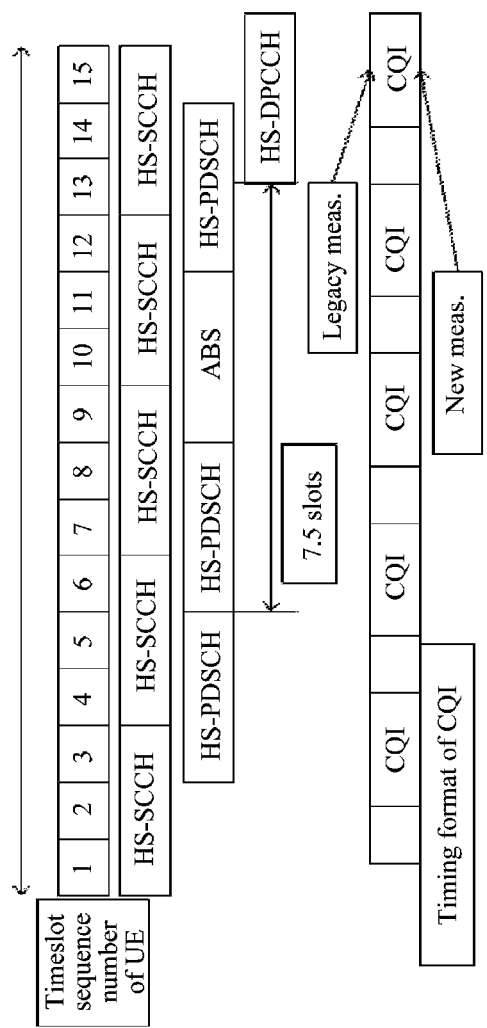
FIG. 4 shows a timing relationship between CQI measurement and an ABS subframe according to an embodiment of the present invention.

In an optional embodiment, when the ABS information does not include ABS pattern information, the UE does not know an ABS pattern. In this case, a CQI measurement reference time window needs to be aligned with a downlink HS-PDSCH subframe. For example, in this case, the measurement reference time window may be a subframe that ends at the 2.5$^{th}$ timeslot before a CQI is transmitted, such as New Meas. shown in FIG. 4. In FIG. 4, New Meas. is a new measurement window, and Legacy Meas. is a measurement window in the prior art. The New Meas. is aligned with the ABS subframe, that is, aligned with an HS-PDSCH subframe in which transmit power is reduced, and the New Meas. represents a new CQI measurement reference time window. For CQIs at other positions, new CQI measurement reference time windows are all aligned with HS-PDSCH subframes received by the UE.

In another optional embodiment, when the ABS information includes ABS pattern information, the UE knows an ABS pattern, and CQI measurement is channel quality measurement performed based on an ABS subframe that is closest to a CQI before the CQI is transmitted. To reserve sufficient processing time for the UE, the CQI needs to be transmitted after a period of time after the ABS subframe ends. Optionally, the period of time may be 2.5 timeslots, as shown in FIG. 4. Optionally, the period of time may also be 5.5 timeslots. Because the network-side device may schedule, only in the ABS subframe, downlink data for the UE, only a CQI reported with respect to the ABS subframe is effective for the network side device in this scenario.

In still another optional embodiment, as an improved method for performing downlink channel quality measurement in the present invention, the UE repeatedly reports, according to an ABS pattern, a CQI corresponding to a first ABS subframe of 2 ABS subframes when reporting a CQI. Optionally, because same content is repeatedly reported, transmit power when the CQI is repeatedly reported may be lower than that when the CQI is normally reported. For example, an originally required CQI transmit power is x dBm per subframe, and for the same CQI repeatedly transmitted, a transmit power may be x-y dBm per subframe, where y is a function of the number of repetitions, for example, $y=10 \log_{10}(1/(R+1))$ dB, where R is the number of repetitions, and if the CQI is repeatedly transmitted once, y is approximately equal to −3. This CQI transmission solution can reduce the transmit power of the UE on the CQI.

In yet another optional embodiment, as another improved method for performing channel quality measurement in the present invention, when reporting a CQI, the UE reports, according to an ABS pattern, only a CQI corresponding to a first ABS subframe of 2 ABS subframes, and does not report another CQI corresponding to a non-ABS subframe. This CQI transmission solution can reduce the transmit power of the UE on the CQI.

3. Link Quality Measurement

The UE performs link quality measurement in the ABS subframe when a serving cell of the UE is a second cell, the UE receives ABS pattern information, and the ABS information received by the UE meets the following conditions: the ABS enabling or disabling information indicates that an ABS is enabled, and the ABS pattern mode indicates that a measurement mode is a link measurement mode. Optionally, performing link quality measurement in an ABS subframe may be performing link quality measurement only in an ABS subframe, or may be performing link quality measurement in both an ABS subframe and a non-ABS subframe. However, a weight of a result of the detecting in an ABS subframe is greater than that of a result of the detecting in a non-ABS subframe.

When link quality measurement is performed, both a second cell and a first cell are in an ABS-enabled state. The quality of a downlink link from the second cell to the UE is poor in the non-ABS subframe, but the quality is fairly good in the ABS subframe. According to an existing continuous link quality measurement method, the UE cannot accurately reflect the link quality in the ABS subframe. Therefore, in this embodiment of the present invention, the UE detects the link quality in the ABS subframe according to an ABS pattern, which helps the UE better maintain the downlink link between the UE and the second cell.

The following description uses link quality measurement only in an ABS subframe as an example.

The UE obtains an ABS pattern 00000001 . . . with a period of 8, and the UE learns that an ABS is enabled and an ABS pattern mode is 2. Measurement performed by the UE on the link quality is only based on an ABS subframe (that is, a pattern is marked by 1). In addition, it should be noted that, a link that needs to be measured by the UE may include but is not limited to F-DPCH and DPCCH channels It should be noted that, pilot quality measurement and link quality measurement belong to downlink physical layer channel quality measurement.

In this embodiment of the present invention, a UE performs downlink channel quality measurement and/or downlink physical layer channel quality measurement according to RRS information sent by a network-side device, which is different from an existing method for downlink channel quality measurement and/or downlink physical layer channel quality measurement. By using this measurement method, the UE can obtain a more accurate downlink channel quality measurement result or downlink physical layer channel quality measurement result.

Figure 5:
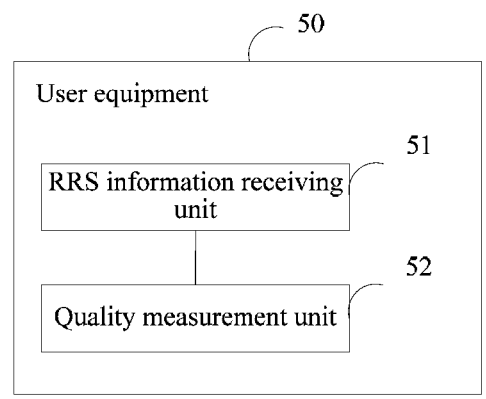
FIG. 5 shows a user equipment according to an embodiment of the present invention.

A fourth embodiment of the present invention provides a user equipment 50, configured to execute the quality measurement methods in the foregoing embodiments. Referring to FIG. 5, the user equipment 50 includes an RRS information receiving unit 51 and a quality measurement unit 52.

The RRS information receiving unit 51 is configured to receive resource restricted subframe RRS information sent by a network-side device; further, the RRS information includes RRS enabling or disabling information and/or RRS pattern mode information and/or RRS pattern information; further, the RRS information is carried in a high speed physical downlink shared control channel order, and is sent to the UE by the network-side device.

The quality measurement unit 52 is configured to perform downlink channel quality measurement and/or downlink physical layer channel quality measurement according to the RRS information.

Further, the quality measurement unit performs the downlink channel quality measurement and/or downlink physical layer channel quality measurement in an RRS subframe according to the RRS information.

Further, the quality measurement unit includes:

a pilot quality measurement module, configured to perform pilot quality measurement in the RRS subframe when a serving cell of the UE is a first cell, and the RRS information meets the following conditions: the RRS enabling or disabling information indicates that an RRS is enabled and the RRS pattern mode information indicates that a measurement mode is a pilot quality measurement mode.

Further, the quality measurement unit may further include:

a channel quality measurement module, configured to perform the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode.

Further, the quality measurement unit may further include:

a link quality measurement module, configured to perform link quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a link quality measurement mode.

Further, the channel quality measurement module includes:

a first measurement submodule, configured to align a channel quality measurement reference time window with a downlink HS-PDSCH subframe when the UE does not receive the RRS pattern information.

Further, the channel quality measurement module may further include:

a second measurement submodule, configured to: when the UE receives the RRS pattern information, perform the downlink channel quality measurement based on an RRS subframe that is closest to a channel quality indicator CQI before the CQI is transmitted.

Further, the second measurement submodule includes:

a first reporting micro-unit, configured to: when reporting a CQI, repeatedly report, according to the RRS pattern information, a CQI corresponding to a first RRS subframe of 2 RRS subframes.

Further, the second measurement submodule may further include:

a second reporting micro-unit, configured to: when reporting a CQI, report, according to the RRS pattern information, only a CQI corresponding to a first RRS subframe of 2 RRS subframes, and skip reporting another CQI corresponding to a non-RRS subframe.

Further, transmit power when the second reporting micro-unit repeatedly reports the CQI is lower than that when the second reporting micro-unit normally reports the CQI.

Figure 6:
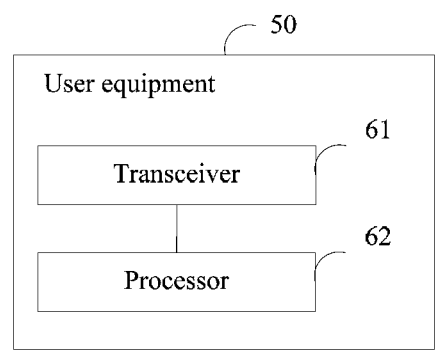
FIG. 6 shows another user equipment according to an embodiment of the present invention.

A fifth embodiment of the present invention provides a user equipment 50, configured to execute the quality measurement methods in the foregoing embodiments. Referring to FIG. 6, the user equipment 50 includes: a transceiver 61 and a processor 62.

The transceiver 61 is configured to receive resource restricted subframe RRS information sent by a network-side device; further, the RRS information includes RRS enabling or disabling information and/or RRS pattern mode information and/or RRS pattern information; further, the RRS information is carried in a high speed physical downlink shared control channel order, and is sent to the UE by the network-side device.

The processor 62 is configured to perform downlink channel quality measurement and/or downlink physical layer channel quality measurement according to the RRS information.

Further, the processor 62 is specifically configured to perform the downlink channel quality measurement and/or downlink physical layer channel quality measurement only in an RRS subframe according to the RRS information.

Further, the processor 62 is specifically configured to perform pilot quality measurement in the RRS subframe when a serving cell of the UE is a first cell, and the RRS information meets the following conditions: the RRS enabling or disabling information indicates that an RRS is enabled and the RRS pattern mode information indicates that a measurement mode is a pilot quality measurement mode.

Further, the processor 62 is specifically configured to perform the downlink channel quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode.

Further, the processor 62 is specifically configured to perform link quality measurement in the RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a link quality measurement mode.

Further, the processor 62 is specifically configured to align a channel quality measurement reference time window with a downlink HS-PDSCH subframe when the UE does not receive the RRS pattern information.

Further, the processor 62 is specifically configured to: when the UE receives the RRS pattern information, perform the downlink channel quality measurement based on an RRS subframe that is closest to a channel quality indicator CQI before the CQI is transmitted.

Further, the processor 62 is specifically configured to: when reporting a CQI, repeatedly report, according to the RRS pattern information, a CQI corresponding to a first RRS subframe of 2 RRS subframes.

Further, the processor 62 is specifically configured to: when reporting a CQI, report, according to the RRS pattern information, only a CQI corresponding to a first RRS subframe of 2 RRS subframes, and skip reporting another CQI corresponding to a non-RRS subframe.

Further, transmit power when the UE repeatedly reports the CQI is lower than that when the UE normally reports the CQI.

A sixth embodiment of the present invention provides a quality measurement method, and the method of this embodiment is executed by a network-side device. The network-side device may be, but is not limited to, a radio network controller, and may also be, for example, a base station in a cell. The method of this embodiment includes: acquiring resource restricted subframe RRS information; and sending the RRS information to a user equipment UE, so that the UE performs downlink channel quality measurement and/or downlink pilot quality measurement and/or downlink link quality measurement according to the RRS information. The RRS information in this embodiment may be the RRS information in the quality measurement method of the first Embodiment of the present invention; when the RRS information is ABS information, the RRS information in this embodiment may be the ABS information in the quality measurement method of the second embodiment of the present invention. Details are not described herein again.

In the quality measurement method of this embodiment, after a network-side device sends RRS information to a user equipment UE, the user equipment executes the quality measurement method according to the received RRS information. Refer to the first Embodiment, the second Embodiment, and the third Embodiment of the present invention for details, which are not described herein again.

Optionally, the network-side device may acquire the RRS information according to UE information in a first cell and a second cell. Optionally, the network-side device may acquire the RRS information according to the number of UEs in a first cell and the number of UEs in a second cell, and a throughput of a UE at an edge of the first cell and a throughput of a UE at an edge of the second cell. For example, when the number of UEs in a microcell is large, and a throughput of the UE in the microcell is quite low, it indicates that the UEs in the microcell are interfered by a macrocell; in this case, an RRS state may be activated, thereby limiting the interference from the macrocell, and improving performance of the microcell. Optionally, RRS pattern information may be determined according to a proportion of the total number of UEs in a macrocell to the total number of UEs in a microcell. When data in the microcell needs to be sent to a UE in the microcell, the UE in the microcell needs to be in a channel measurement mode, and the microcell learns, by using a channel measurement result, a size of a data block that needs to be sent to the UE. Optionally, the UE in the microcell may use a link quality mode to obtain a link quality measurement result matching the interference. A pilot measurement mode may be configured for the UE in the macrocell, so that the UE in the macrocell can discover the microcell earlier.

A seventh embodiment of the present invention provides a network-side device, configured to execute the quality measurement method in the sixth embodiment. The network-side device in this embodiment includes an acquiring unit, configured to acquire resource restricted subframe RRS information; and a sending unit, configured to send the RRS information to a user equipment UE, so that the UE performs downlink channel quality measurement and/or downlink pilot quality measurement and/or downlink link quality measurement according to the RRS information.

Optionally, the acquiring unit acquires the RRS information according to UE information in a first cell and a second cell. Optionally, the acquiring unit may acquire the RRS information according to the number of UEs in a first cell and the number of UEs in a second cell, and a throughput of a UE at an edge of the first cell and a throughput of a UE at an edge of the second cell. Optionally, the acquiring unit may determine RRS pattern information according to a proportion of the total number of UEs in a macrocell to the total number of UEs in a microcell.

An eighth embodiment of the present invention provides a network-side device, configured to execute the quality measurement method in the sixth embodiment. The network-side device in this embodiment includes a processor, configured to acquire resource restricted subframe RRS information; and a sender, configured to send the RRS information to a user equipment UE, so that the UE performs downlink channel quality measurement and/or downlink pilot quality measurement and/or downlink link quality measurement according to the RRS information.

Optionally, the processor acquires the RRS information according to UE information in a first cell and a second cell. Optionally, the processor may acquire the RRS information according to the number of UEs in a first cell and the number of UEs in a second cell, and a throughput of a UE at an edge of the first cell and a throughput of a UE at an edge of the second cell. Optionally, the processor may determine RRS pattern information according to a proportion of the total number of UEs in a macrocell to the total number of UEs in a microcell.

Figure 7:
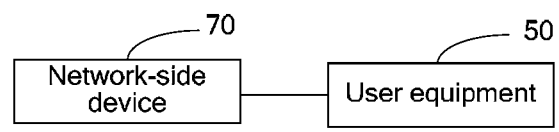
FIG. 7 shows a quality measurement system according to an embodiment of the present invention.

A ninth embodiment of the present invention provides a quality measurement system, and referring to FIG. 7, the system includes a network-side device 70 according to the seventh or eighth embodiment and the user equipment 50 according to the fourth or fifth embodiment.

In the quality measurement system provided by this embodiment of the present invention, a network-side device sends RRS information to a UE, so that the UE performs downlink channel quality measurement and/or downlink physical layer channel quality measurement according to the RRS information. This measurement method is different from an existing measurement method, and can solve a problem of low precision in a downlink channel quality measurement result or a downlink physical layer channel quality measurement result of a UE in the prior art.

In the foregoing embodiments, a first cell is a microcell, and a second cell is a macrocell, or a first cell is a macrocell, and a second cell is a microcell, or a first cell is a microcell, and a second cell is a microcell, or a first cell is a macrocell, and a second cell is macrocell, which are not described herein again.

It should be noted that, in the foregoing system embodiments, the unit division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The foregoing descriptions are merely exemplary embodiments of the present invention, but are not intended to limit the present invention. Any modification, equivalent replacement, or improvement made without departing from the principle of the present invention should fall within the protection scope of the present invention.

What is claimed is:

1. A quality measurement method, comprising:
   receiving, by a user equipment (UE), resource restricted subframe (RRS) information sent by a network-side device, wherein the RRS information comprises at least one of RRS enabling or disabling information, RRS pattern mode information, and RRS pattern information; and
   performing according to the RRS information, by the UE, a downlink channel quality measurement, wherein the performing comprises:
      performing the downlink channel quality measurement in an RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode; and
      performing, when the UE receives the RRS pattern information, the downlink channel quality measurement based on an RRS subframe that is closest to a channel quality indicator (CQI) measurement reference time window before the CQI is transmitted;
   wherein when the UE reports a CQI, repeatedly reporting, according to the RRS pattern information, a CQI corresponding to a first RRS subframe of two RRS subframes, and wherein transmit power when the UE repeatedly reports the CQI is lower than that when the UE normally reports the CQI.

2. A user equipment (UE) comprising a processor and a memory, wherein the processor is configured to:
   receive resource restricted subframe (RRS) information sent by a network-side device, wherein the RRS information comprises at least one of RRS enabling or disabling information, RRS pattern mode information, and RRS pattern information; and
   perform, according to the RRS information, a downlink channel quality measurement, wherein the perform, according to the RRS information, downlink channel quality measurement comprises:
      performing the downlink channel quality measurement in an RRS subframe when a serving cell of the UE is a second cell, the UE receives RRS pattern information, and the RRS information received by the UE meets the following conditions: the RRS enabling or disabling information indicates that an RRS is enabled and the RRS pattern mode information indicates that a measurement mode is a downlink channel quality measurement mode; and
      performing, when the UE receives the RRS pattern information, the downlink channel quality measurement based on an RRS subframe that is closest to a channel quality indicator (COI) measurement reference time window before the CQI is transmitted;
   wherein when the UE reports a CQI, repeatedly reporting, according to the RRS pattern information, a CQI corresponding to a first RRS subframe of two RRS subframes, and wherein transmit power when the UE repeatedly reports the CQI is lower than that when the UE normally reports the CQI.

* * * * *